US007872589B2

(12) United States Patent
Romig et al.

(10) Patent No.: US 7,872,589 B2
(45) Date of Patent: Jan. 18, 2011

(54) APPARATUS AND METHOD FOR CONTROLLING FLIGHT DECK LIGHT INTENSITY

(75) Inventors: Emma Romig, Seattle, WA (US); Jonathan T. Barrows, Woodinville, WA (US); Michael S. Koehn, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 279 days.

(21) Appl. No.: 11/957,014

(22) Filed: Dec. 14, 2007

(65) Prior Publication Data

US 2009/0153347 A1 Jun. 18, 2009

(51) Int. Cl.
 *G08B 5/00* (2006.01)
(52) U.S. Cl. .................................. 340/815.4; 340/545.3
(58) Field of Classification Search .............. 340/815.4, 340/540, 541, 545.2, 545.3, 691.1
See application file for complete search history.

(56) References Cited

U.S. PATENT DOCUMENTS

| 5,428,345 | A  | * | 6/1995 | Bruno | 340/541 |
| 5,673,016 | A  | * | 9/1997 | Lutes | 340/326 |
| 6,752,772 | B2 | * | 6/2004 | Kahn | 601/98 |
| 6,864,795 | B2 | * | 3/2005 | Smith et al. | 340/573.1 |
| 6,960,892 | B2 | * | 11/2005 | Loughrey | 315/294 |
| 7,199,531 | B2 | * | 4/2007 | Loughrey | 315/294 |
| 2003/0212352 | A1 | * | 11/2003 | Kahn | 601/98 |

* cited by examiner

*Primary Examiner*—Travis R Hunnings
(74) *Attorney, Agent, or Firm*—Weiss & Moy, P.C.

(57) ABSTRACT

A system for controlling lighting of an instrument panel has a sensor for monitoring activity near the instrument panel. A lighting control unit is coupled to the sensor and a lighting system of the instrument panel. The lighting control unit controls the light intensity of the lighting system. The lighting control unit increases the intensity of the lighting system when the sensor monitors activity near the instrument panel.

18 Claims, 5 Drawing Sheets

APPARATUS AND METHOD FOR CONTROLLING FLIGHT DECK LIGHT INTENSITY

BACKGROUND

Embodiments of this disclosure relate generally to aircraft lighting, and more particularly, to an apparatus and method to control the light intensity for flight deck light elements.

Aircraft flight decks generally have instrument panels which typically include integral lighting systems to illuminate the panel nomenclature and markings on displays and controls located on the panels. The integral lighting systems generally assist a flight crew in locating displays and controls while operating the aircraft. During night-time or when the outside ambient light condition is low, these light sources can cause reflections to appear in the windows of the aircraft flight deck. The reflections are problematic for several reasons. First, the reflections may cause customer complaints. When a customer sees the light reflections in the flight deck windows, the customer may feel uncomfortable since the reflections appear to obstruct the flight crews' ability to see through the window. Second, the reflections may violate regulatory requirements since the reflections can cause distraction or other visual effects that reduce a pilot's ability to fly the plane effectively.

Due to the number of light emitting elements and the general location of these elements within the flight deck, it is exceedingly difficult to fully eliminate the reflections. Without eliminating the functions of the light elements, which is not possible since it would hinders one's ability to see the particular control, or reducing the rake of the windshield, which has negative aerodynamic effects, the reflections are a recurring problem.

There are certain methods to adjust the intensity of the lighting elements. Presently, pilots may manually adjust the light intensity of certain lighting elements. However, manually adjusting the lighting elements is a distraction to the pilot as the pilot must locate the light dimming adjustment knob and then manually adjust the lighting element to a desired level. Thus, the manual adjustment of the light dimming adjustment knob reduces a pilot's ability to fly the plane effectively. Some of the lighting elements have light sensors which detect the ambient light level. When the ambient light level falls below a predefined level the light sensor will activate the light elements. Once the ambient light level falls below the predefined level, these types of light sensors drive the lighting element to a fully illuminated state which increases the perceived reflections. Unfortunately, these types of sensors are not adjustable.

Different attempts have been made to block the light reflections. For example, antireflective (AR) coatings and the use of physical objects such as the glare shields have been used to try and reduce the reflections from the light elements. However each of these methods has certain disadvantages. AR coatings tend to be costly to apply and are generally rather easy to damage. Physical objects, such as the glare shield can be used, but based on the geometry of the windshield and aisle stand, the glare shield needs to come very near the pilot in order to be effective. However, by having the glare shield near the pilot's face, many pilots having a feeling of claustrophobia.

Therefore, it would be desirable to provide an apparatus and method that overcomes the above problems. The apparatus and method would allow one to control the light intensity for flight deck light elements.

SUMMARY

A system for controlling lighting of an instrument panel has a sensor for monitoring activity near the instrument panel. A lighting control unit is coupled to the sensor and a lighting system of the instrument panel. The lighting control unit controls the light intensity of the lighting system. The lighting control unit increases the intensity of the lighting system when the sensor monitors activity near the instrument panel.

A system for controlling lighting of an instrument panel has a sensor for monitoring activity near the instrument panel. A lighting control unit is coupled to the sensor and to a lighting system of the instrument panel. The lighting control unit is used to control the light intensity of the lighting system. The lighting control unit increases the intensity of the lighting system when the sensor monitors an appendage of a flight crew member in front of the instrument panel.

A system for controlling lighting of an instrument panel has a sensor for monitoring when an appendage of a flight crew member is positioned in front of the instrument panel. A lighting control unit is coupled to the sensor and to a lighting system of the instrument panel. The lighting control unit increases the intensity of the lighting system when the sensor monitors the appendage of the flight crew member in front of the instrument panel and decreases the intensity of the lighting system when the sensor monitors the appendage of the flight crew member has been removed from in front of the instrument panel.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
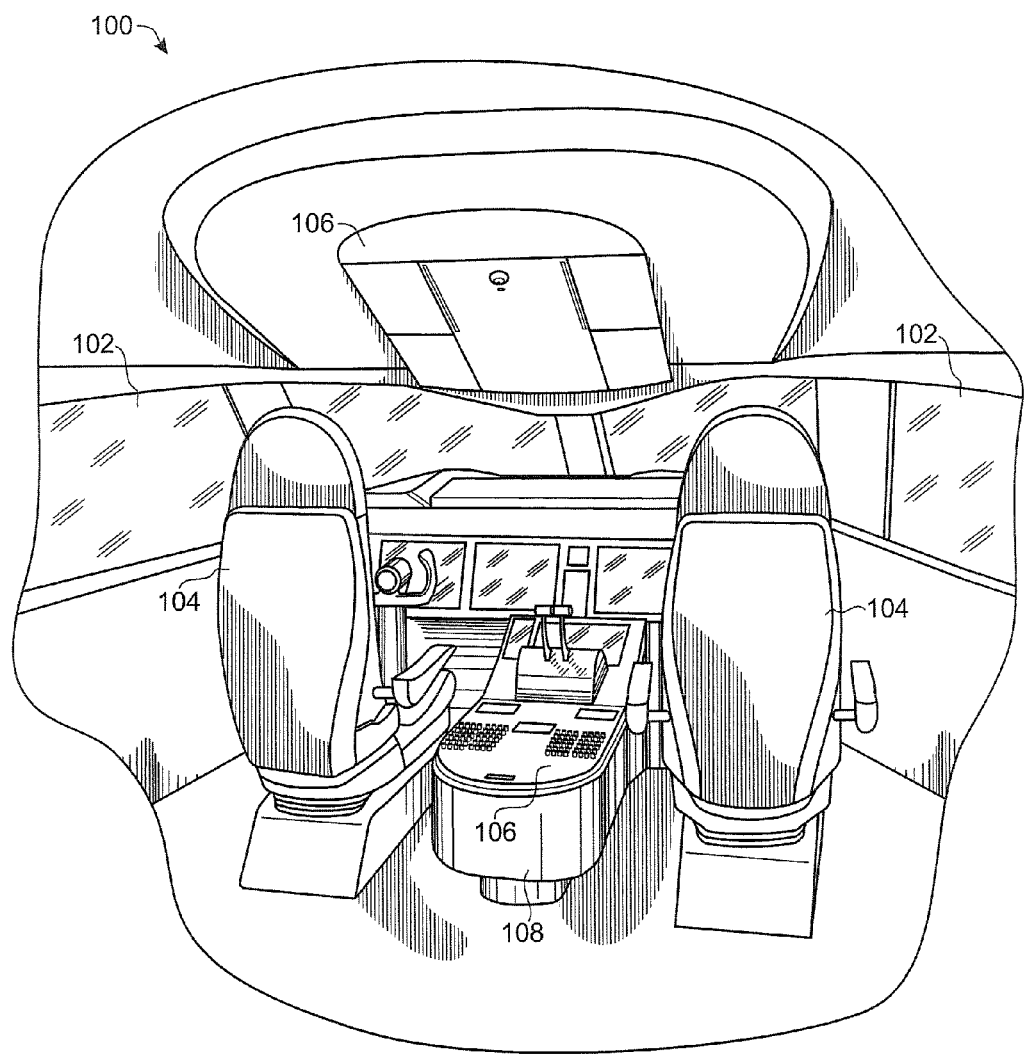
FIG. 1 is a perspective view of an aircraft flight deck.

With reference now to the FIGS. 1, a perspective view of a flight deck 100 of an aircraft is shown. The flight deck 100 will have one or more windows 102. The windows 102 are positioned in a front area of the flight deck 100 and allow the flight crew to see outside of the flight deck 100. One or more seating area(s) 104 are positioned in front of the windows 102. The seating areas 104 are used by the flight crew so that they may have a comfortable position to fly the aircraft. A plurality of instrument panels 106 are positioned around the seating area(s) 104. The instrument panels 106 will include displays, annunciators, switches, and other types of control mechanisms which enable the flight crew to fly the aircraft.

Many of the control/monitoring mechanisms on the instrument panels 106 have light emitting devices. The light emitting devices enable the flight crew to view/see the control/monitoring mechanisms during night-time or during low outside ambient light conditions. However, the light emitting devices can cause reflections to appear in the windows 102. This is especially true of the light emitting devices for control/ monitoring mechanisms located on the aisle-stand 108 due to the position of the aisle-stand in relation to the windows 102. Thus, the light emitting devices in the instrument panels 106 positioned in the aisle stand 108 will shine directly into the windows 102.

Figure 2:
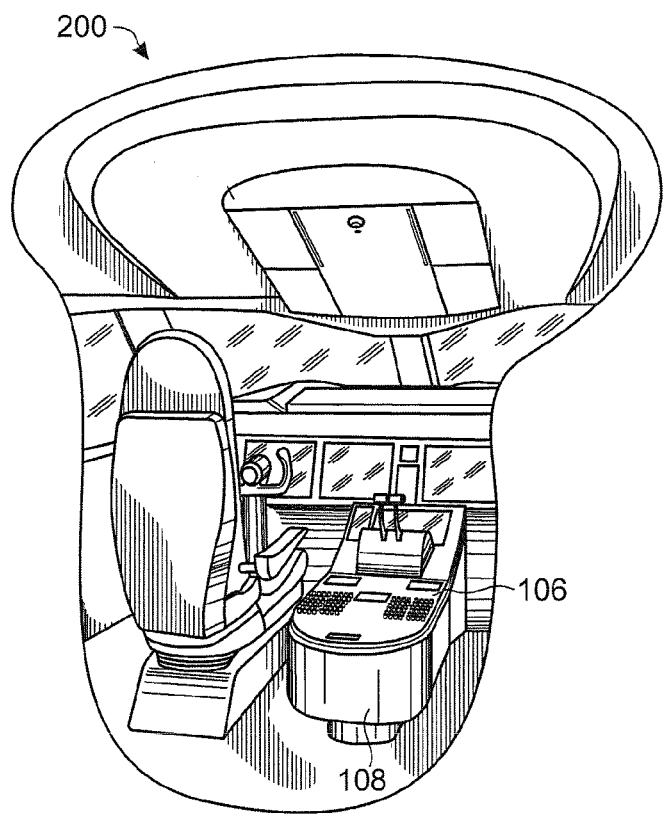
FIG. 2 is a simplified perspective view of the light sensor for controlling lighting elements on the flight deck.

Referring to FIG. 2, a simplified view of a sensor device 200 for controlling lighting elements on the flight deck 100 is shown. The sensor device 200 is coupling to a lighting system of the instrument panels 106. In the embodiment depicted in FIG. 2, the instrument panel 106 is located in the aisle-stand 108 of the flight deck 100. However, this is just shown as an example. The sensor device 200 may be used to control the lighting system of any instrument panel 106 in the flight deck 100.

The sensor device 200 is a non-contact sensor used to monitor activity near the instrument panel 106. When activity is recorded, the sensor device 200 will automatically illuminate the lighting system of the instrument panels 106 for a predetermined period of time. When the predetermined amount of time expires, the lighting system of the instrument panels 106 will dim back to a pre-activity level. Alternatively, when activity is recorded, the sensor device 200 will automatically illuminate the lighting system of the instrument panels 106. The lighting system will stay illuminated until activity is no longer monitored by the sensor device 200. Thus, the sensor device 200 is based on pilot's activity rather than prior art devices which require manually setting the light intensity or adjusting based on ambient light levels.

Figure 3A:
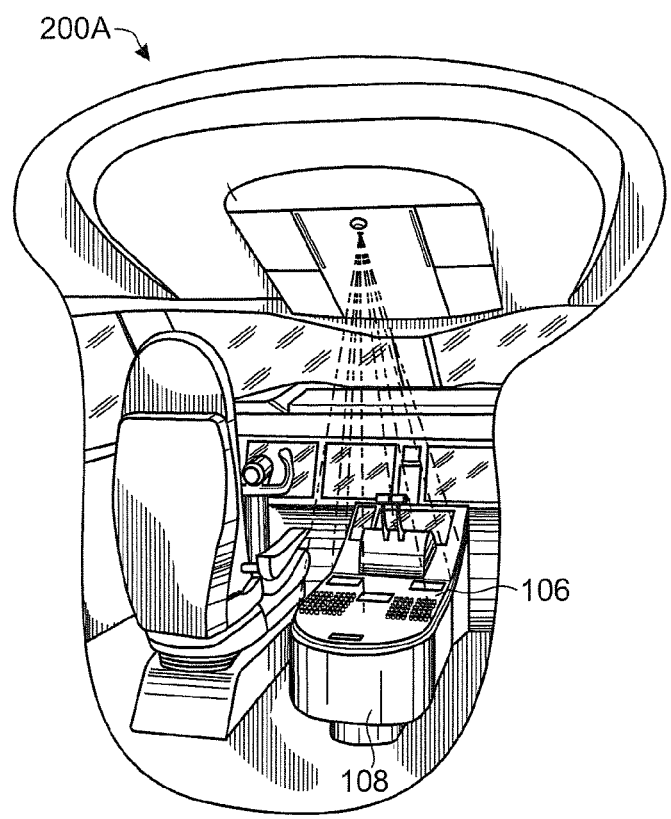
FIG. 3A-3D are simplified perspective views of different embodiments of the light sensor for controlling lighting elements on the flight deck.

The sensor device 200 may take on different forms. Referring to FIGS. 3A-3D, different embodiments of the sensor device 200 are shown. As shown in FIG. 3A, the sensor device 200 is an infra-red sensor 200A. In the embodiment depicted in FIG. 3A, the infra-red sensor 200A is mounted above the instrument panel 106 located in the aisle-stand 108. The infra-red sensor 200A will emit infra-red energy that is invisible to the human eye. The infra-red sensor 200A focuses the infra-red energy onto the surface of the instrument panel 106. In general, the infra-red sensor 200A will be a passive infra-red sensor. The term passive means the infra-red sensor 200A will not emit energy of any type but merely accepts incoming infrared radiation.

When the pilot or other flight crew member (hereinafter flight crew member) places a hand/arm or other body part (hereinafter hand) into the monitored area the infrared energy emitted from the hand is monitored and compared to that of the instrument panel 106. Since the infra-red energy from the hand is different from that of the instrument panel 106, the infra-red sensor 200A will send a signal to activate the lighting system of the instrument panels 106 causing the instrument panel 106 to illuminate at a higher level. After a predetermined amount of time or when the hand is removed, the lighting system of the instrument panels 106 will return the instrument panel 106 to an original illumination state prior to when the infra-red sensor 200A monitored the flight crew member's activity assuming that the flight crew member's hand is still not located in the monitored area. If the flight crew member's hand is still located in the monitored area, the infra-red sensor 200A will send a signal to activate the lighting system of the instrument panels 106 causing the instrument panel 106 to remain illuminate at the higher level.

Figure 3B:
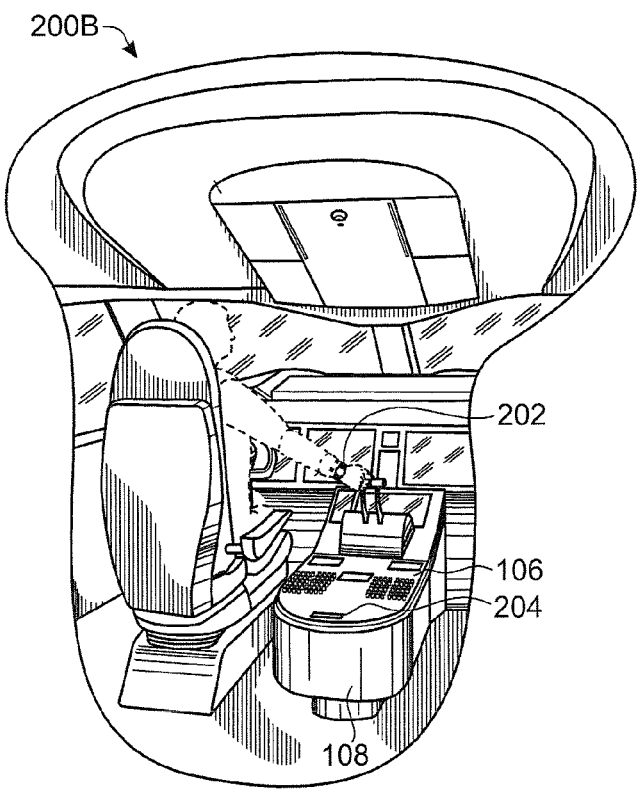

Referring now to FIG. 3B, the sensor device 200 is a proximity sensor 200B. The proximity sensor 200B is used to detect the location of an object without any physical contact. When the proximity sensor 200B senses that the object to be detected is within a predefined distance, the proximity sensor 200B will be triggered. The proximity sensor 200B may use strength of signal to determine the distance of the object to be detected. The strength of signal may be measured using Radio Frequency Identification (RFID) methods, or by detecting infrared or ultrasonic signals, and the like.

In the embodiment depicted in FIG. 3B, the proximity sensor 200B is comprised of a receiver 204 mounted under the instrument panel 106 located in the aisle-stand 108. The flight crew members would have a transmitter 202 which sends out a signal to be received by the receiver 204. The transmitter 202 would generally be worn on the wrist or hand of the flight crew member. The receiver 204 will receive the signals transmitted by the transmitter 202 and calculate the distance of the transmitter 202 from the receiver 204. When the transmitter 202 comes within a predetermined distance of the receiver 204, the receiver 204 will activate the lighting system of the instrument panels 106 causing the instrument panel 106 to illuminate at a higher level. After a predetermined amount of time or as soon as the transmitter 202 is no longer within the predetermined distance, the lighting system of the instrument panels 106 will return the instrument panel 106 to an original illumination state prior to when the receiver 204 indicated that the transmitter 202 was within the predetermined distance. If the transmitter 202 is still within the predetermined distance of the receiver 204, the receiver 204 will send a signal to activate the lighting system of the instrument panels 106 causing the instrument panel 106 to remain illuminate at the higher level.

Figure 3C:
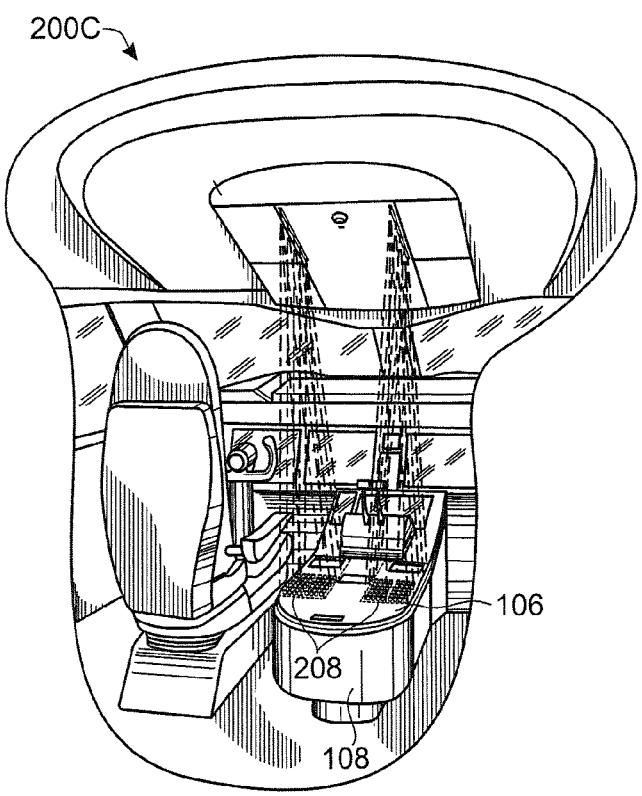

Referring to FIG. 3C, in this embodiment, the sensor device 200 is a laser sensor 200C. The laser sensor 200C uses a non-visible laser to determine if a flight crew member's hand is located within the monitored area. In the embodiment depicted in FIG. 3C, the laser sensor 200C is comprised of a laser source 206 and a laser detector 208. The laser source 206 is generally mounted above the instrument panel 106 located in the aisle-stand 108. The laser detector 208 is located in the instrument panel 106. The laser source 206 will emit a non-visible laser which is sent to the surface of the instrument panel 106 and received by the laser detector 208. When the flight crew member places a hand into the monitored area, the hand will interrupt the laser from reaching the laser detector 208. The laser detector 208 will then send a signal to activate the lighting system of the instrument panels 106 causing the instrument panel 106 to illuminate at a higher level. After a predetermined amount of time or once the hand is removed, the lighting system of the instrument panels 106 will return the instrument panel 106 to an original illumination state prior to when the laser detector 208 monitored the flight crew member's hand. If the flight crew member's hand is still located in the monitored area, the laser detector 208 will send a signal to activate the lighting system of the instrument panels 106 causing the instrument panel 106 to remain illuminate at the higher level.

Figure 3D:
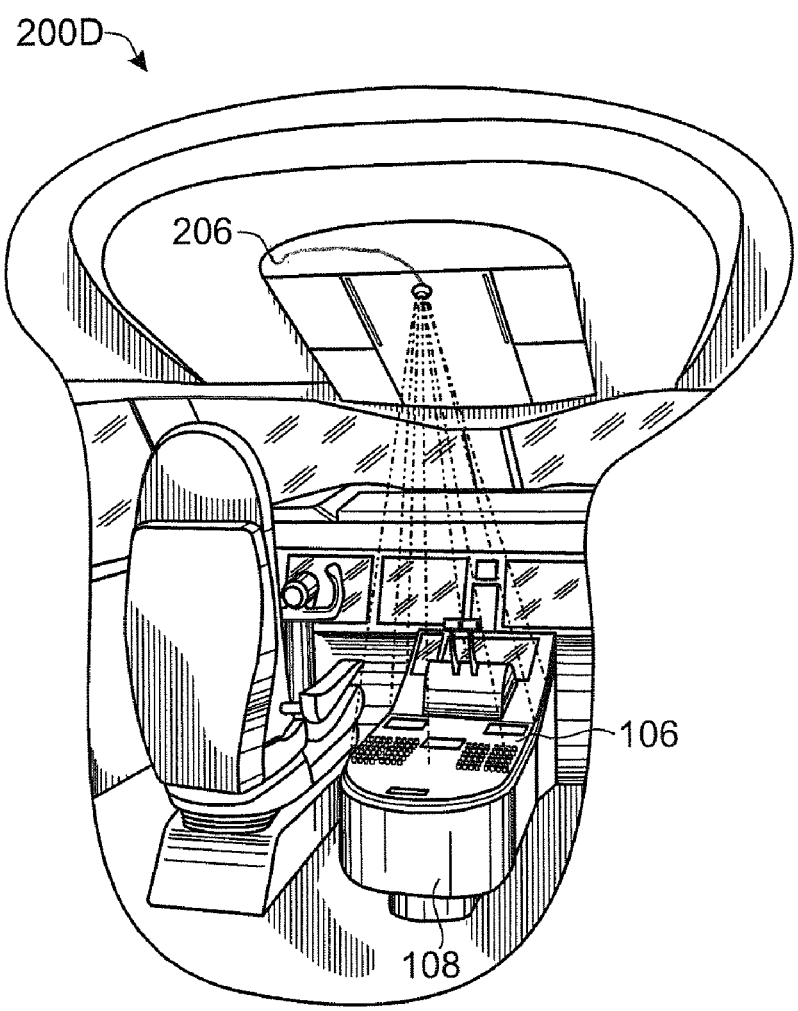

Referring to FIG. 3D, the sensor device 200 is a Charge Coupled Device (CCD) camera 200D. The CCD camera 200D is a type of image sensor. The CCD camera 200D is mounted above the instrument panel 106 located in the aisle-stand 108. The CCD camera 200D will monitor the surface of the instrument panel 106. When the flight crew member places a hand into the monitored area the CCD camera 200D will compare the new image with that of the instrument panel 106. Since the new image is different from that of the instrument panel 106, the CCD camera 200D will send a signal to activate the lighting system of the instrument panels 106 causing the instrument panel 106 to illuminate at a higher level. After a predetermined amount of time or once the hand is removed, the lighting system of the instrument panels 106 will return the instrument panel 106 to an original illumination state prior to when the CCD camera 200D monitored the flight crew member's activity assuming that the flight crew member's hand is still not located in the monitored area. If the flight crew member's hand is still located in the monitored area, the CCD camera 200D will send a signal to activate the lighting system of the instrument panels 106 causing the instrument panel 106 to remain illuminate at the higher level.

Figure 4:
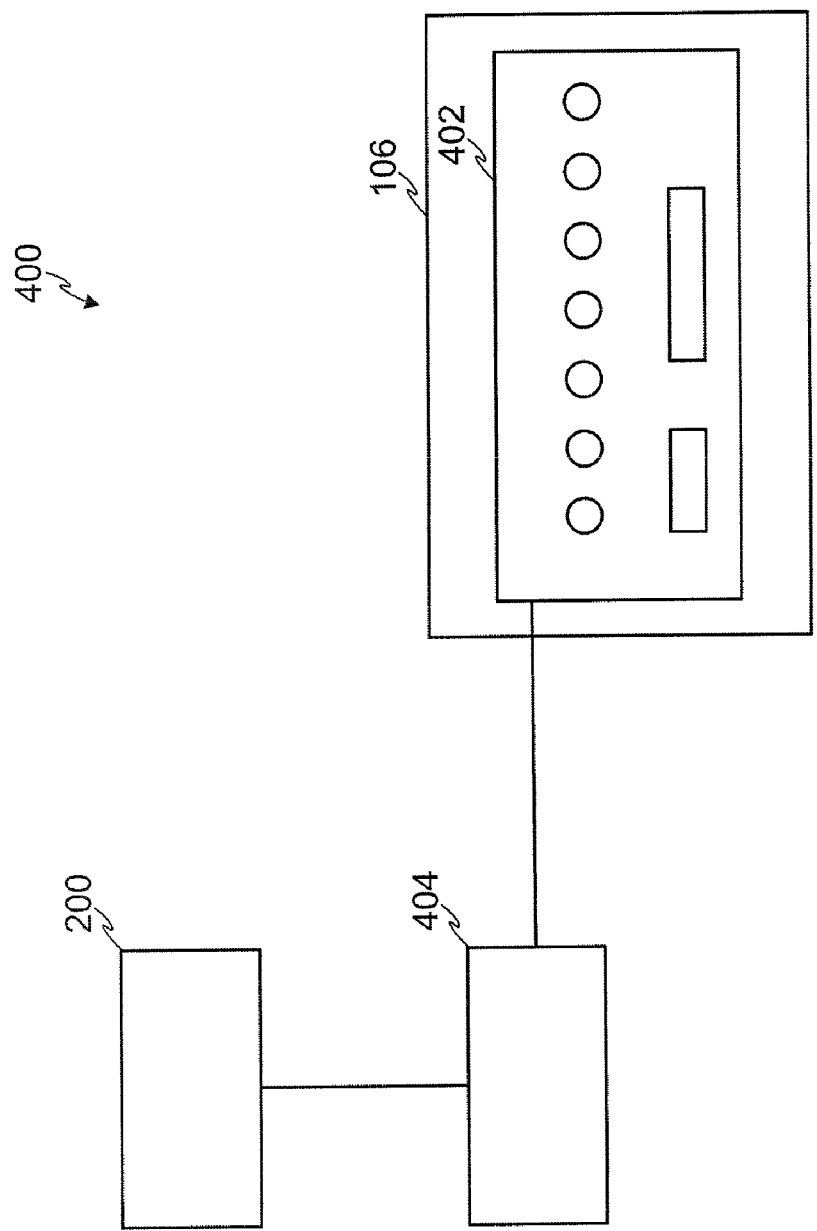
FIG. 4 is a simplified functional block diagram of the light sensor circuit.

Referring to FIG. 4, a simplified block diagram of a sensor circuit 400 for controlling the lighting system 402 of the instrument panels 106 is shown. The sensor circuit 400 has a sensor device 200. The sensor device 200 is used to monitor activity near the instrument panel 106. The sensor device 200 may be an infra-red sensor, a proximity sensor, laser sensors, radar based motion sensors, ultrasonic motion sensors, and the like. The listing of the sensor devices 200 is given as an example and should not be seen as to limit the scope. The sensor device 200 is coupled to a lighting control unit 404. The lighting control unit 404 controls the lighting system 402 of the instrument panel 106. When the sensor device 200 senses activity near the instrument panel 106, the sensor device 200 will send a signal to the lighting control unit 404. The lighting control unit 404 will then send a signal to illuminate the lighting system 402 of the instrument panels 106.

The lighting control unit 404 may control the instrument panel 106 in different manners. In accordance with one embodiment, the lighting control unit 404 will send a signal to illuminate the lighting system 402 at a higher level. Thus, if the lighting system 402 is currently not illuminated, the lighting control unit 404 will send a signal to illuminate the lighting system 402. If the lighting system 402 is currently illuminated like at night time, the lighting control unit 404 will send a signal to illuminate the lighting system 402 at a higher level to allow the flight crew member to better see the instrument panel 106. At night time or when the outside ambient light conditions are low, the lighting system 402 may be illuminated at a low level to allow the flight crew member to see the instrument panel 106 but is not bright enough so as to cause reflections to appear in the windows of an aircraft flight deck. When a flight crew member needs to use the instrument panel 106, the flight crew member will place his/her hand in the monitored area near the instrument panel 106. The sensor device 200 will send a signal to the lighting control unit 404 which will illuminate the lighting system 402 at a higher level to allow the flight crew member to better see the instrument panel 106.

The lighting control unit 404 may further be programmed so that each time the flight crew member places his/her hand in the monitored area near the instrument panel 106 before the expiration of a predetermined time frame, the lighting control unit 404 will send a signal to cause the lighting system 402 to illuminate at a higher level. Thus, for example, when the flight crew member places his hand in the monitored area a first time, the lighting control unit 404 will send a signal to cause the lighting system 402 to illuminate at a first level. After a predetermined amount of time, the lighting system 402 of the instrument panels 106 will return the instrument panel 106 to an original illumination state prior to when the sensor device 200 monitored the flight crew member's activity. However, if the flight crew member places his hand in the monitored area a second time prior to expiration of the predetermined time frame, the lighting control unit 404 will send a signal to cause the lighting system 402 to illuminate at a second higher level. This process may continue up to any number/light intensity that is desired.

The sensor circuit 400 offers a system and method to control lighting in the flight deck that is based on a flight crew member's activity. The flight crew member does not have to manually set the lights' intensity or adjust the light level based on ambient light levels. The sensor circuit 400 uses non-contact sensors 200. By employing these types of sensors 200, the flight crew members do not need to physically control the light settings. This reduces the workload of the flight crew members.

While embodiments of the disclosure have been described in terms of various specific embodiments, those skilled in the art will recognize that the embodiments of the disclosure can be practiced with modifications within the spirit and scope of the claims.

What is claimed is:

1. A system for controlling lighting of an instrument panel comprising:
   a sensor for monitoring activity near the instrument panel; and
   a lighting control unit coupled to the sensor and a lighting system of the instrument panel for controlling light intensity of the lighting system, wherein the lighting control unit increases intensity of the lighting system when the sensor monitors activity near the instrument panel, wherein the lighting control unit will decrease the intensity of the lighting system back to an original light intensity after a predetermined time period when the sensor monitors inactivity near the instrument panel.

2. A system for controlling lighting of an instrument panel in accordance with claim 1 wherein the lighting control unit will increase the intensity of the lighting system for a predetermined time period when the sensor monitors activity near the instrument panel.

3. A system for controlling lighting of an instrument panel in accordance with claim 1 wherein the lighting control unit will decrease the intensity of the lighting system back to an original light intensity when the sensor monitors inactivity near the instrument panel.

4. A system for controlling lighting of an instrument panel in accordance with claim 1 wherein the lighting control increases the intensity of the lighting system each time the sensor monitors activity near the instrument panel within a predetermined time frame.

5. A system for controlling lighting of an instrument panel in accordance with claim 1 wherein the sensor is an infra-red sensor.

6. A system for controlling lighting of an instrument panel in accordance with claim 1 wherein the sensor is a proximity sensor, the proximity sensor comprising:
   a transmitter coupled to a wrist of a flight crew member; and
   a receiver located in the instrument panel to receive signals transmitted by the transmitter and to calculate a distance of the transmitter from the receiver.

7. A system for controlling lighting of an instrument panel in accordance with claim 1 wherein the sensor is a laser sensor, the laser sensor comprising:
   a laser source located in front of the instrument panel for transmitting a non-visible laser beam; and
   a laser detector located in the instrument panel for receiving the non-visible laser beam.

8. A system for controlling lighting of an instrument panel in accordance with claim 1 wherein the sensor is an image sensor.

9. A system for controlling lighting of an instrument panel comprising;
   a sensor for monitoring activity near the instrument panel; and
   a lighting control unit coupled to the sensor and a lighting system of the instrument panel wherein the lighting system illuminates the instrument panel, the lighting control unit controlling light intensity of the lighting system, the lighting control unit increases intensity of the lighting system when the sensor monitors an appendage of a flight crew member in front of the instrument panel, wherein the lighting control unit will decrease the intensity of the lighting system back to an original light intensity when the sensor monitors inactivity near the instrument panel.

10. A system for controlling lighting of an instrument panel in accordance with claim 9 wherein the sensor is an infra-red sensor position in front of the instrument panel, the infra-red sensor transmitting an infra-red energy signal onto the instrument panel, the infra-red sensor sending a signal to the lighting control unit to increase the intensity of the lighting system when the infra-red energy signal is transmitted onto a portion of the appendage of the flight crew member.

11. A system for controlling lighting of an instrument panel in accordance with claim 9 wherein the sensor is a proximity sensor, the proximity sensor comprising:
   a transmitter coupled to a wrist of a flight crew member; and
   a receiver located in the instrument panel to receive signals transmitted by the transmitter and to calculate a distance of the transmitter from the receiver, the receiver sending a signal to increase the intensity of the lighting system when the transmitter is within a predetermined distance from the receiver.

12. A system for controlling lighting of an instrument panel in accordance with claim 9 wherein the sensor is a laser sensor, the laser sensor comprising:
   a laser source located in front of the instrument panel for transmitting a non-visible laser beam; and
   a laser detector located in the instrument panel for receiving the non-visible laser beam, the laser detector sending a signal to increase the intensity of the lighting control unit when the laser detector is interrupted from receiving the non-visible laser beam.

13. A system for controlling lighting of an instrument panel in accordance with claim 9 wherein the sensor is an image sensor positioned in front of the instrument panel, the image sensor monitoring the instrument panel, the image sensor sending a signal to the lighting control unit to increase the intensity of the lighting system when the image sensor monitors a change of appearance to the instrument panel.

14. A system for controlling lighting of an instrument panel in accordance with claim 9 wherein the lighting control unit will increase the intensity of the lighting system for a predetermined time period when the sensor monitors activity near the instrument panel, the lighting control unit decreasing the intensity of the lighting system back to an original light intensity after the predetermined time period.

15. A system for controlling lighting of an instrument panel in accordance with claim 9 wherein the lighting control increases the intensity of the lighting system each time the sensor monitors activity near the instrument panel within a predetermined time frame.

16. A system for controlling lighting of an instrument panel comprising:
   a sensor for monitoring when an appendage of a flight crew member is positioned in front of the instrument panel; and
   a lighting control unit coupled to the sensor and a lighting system of the instrument panel, the lighting control unit increasing intensity of the lighting system which illuminates the instrument panel when the sensor monitors the appendage of the flight crew member in front of the instrument panel and decreasing the intensity of the lighting system when the sensor monitors the appendage of the flight crew member is removed from in front of the instrument panel, wherein the lighting control unit will decrease the intensity of the lighting system back to an original light intensity when the sensor monitors inactivity near the instrument panel.

17. A system for controlling lighting of an instrument panel in accordance with claim 16 wherein the lighting control unit will increase the intensity of the lighting system for a predetermined time period when the sensor monitors the appendage in front of the instrument panel, the lighting control unit decreasing the intensity of the lighting system back to an original light intensity after the predetermined time period and the sensor monitors the appendage is removed from in front of the instrument panel.

18. A system for controlling lighting of an instrument panel in accordance with claim 16 wherein the lighting control increases the intensity of the lighting system each time the sensor monitors the appendage in front of the instrument panel within a predetermined time frame.

* * * * *